United States Patent [19]

Cook

[11] Patent Number: 4,495,539

[45] Date of Patent: Jan. 22, 1985

[54] EXCESS VOLTAGE ARRESTERS

[75] Inventor: Kenneth G. Cook, Northwood, England

[73] Assignee: The M-O Valve Company Limited, England

[21] Appl. No.: 490,236

[22] Filed: Jun. 13, 1983

Related U.S. Application Data

[63] Continuation of Ser. No. 285,061, Jul. 20, 1981, abandoned.

[30] Foreign Application Priority Data

Sep. 19, 1981 [GB] United Kingdom ................ 8030419

[51] Int. Cl.$^{3}$ ............................................. H02H 9/06

[52] U.S. Cl. .................................. 361/124; 361/120; 361/129; 313/306; 313/325

[58] Field of Search ............... 361/124, 120, 129, 117, 361/119; 313/325, 306, 217, 231.1; 315/35, 36

[56] References Cited

U.S. PATENT DOCUMENTS

| | | | |
|---|---|---|---|
| 3,289,027 | 11/1966 | Jones | 361/120 X |
| 3,388,274 | 6/1968 | Kawiecki et al. | 361/120 X |
| 3,791,711 | 2/1974 | Jonassen | 361/120 X |
| 3,958,154 | 5/1976 | Hill et al. | 361/124 |
| 4,009,422 | 2/1977 | Woodfill | 361/120 |

OTHER PUBLICATIONS

"Surge Protection in the Telephone and Electronics Industry", A Technical Presentation–May 1978, The M. O. Valve Co., General Elect. Co., by K. G. Cook.

*Primary Examiner*—Patrick R. Salce
*Attorney, Agent, or Firm*—Kirschstein, Kirschstein, Ottinger & Israel

[57] ABSTRACT

An excess voltage arrester of the kind comprising a gas-filled enclosure having an electrode structure (1, 11, 13) within the enclosure which defines at least one discharge gap. A portion of at least one electrode (13) is adapted to melt on overheating of the arrester so as to take up a generally spherical form (19) under the action of surface tension and thereby contact another electrode (1).

2 Claims, 2 Drawing Figures

EXCESS VOLTAGE ARRESTERS

This is a continuation, of application Ser. No. 285,061 filed July 20, 1981, now abandoned.

This invention relates to excess voltage arresters.

The invention relates particularly to excess voltage arresters of the kind comprising a gas-filled enclosure and an electrode structure within the enclosure which defines at least one discharge gap.

In use an arrester of the kind specified is connected across an equipment it is desired to protect against excess voltage, the discharge gap breaking down on the occurrence of excess voltage. In the event that a discharge should occur in the arrester over a prolonged period such that the arrester overheats, it is important that the arrester should reliably fail in a safe manner so as not to leave the equipment unprotected.

It is an object of the present invention to provide an excess voltage of the kind specified which on overheating fails in such a manner.

According to the present invention in an excess voltage arrester of the kind specified a portion of at least one electrode is adapted to melt on overheating of the arrester so as to take up a generally spherical form under the action of surface tension and thereby contact another electrode.

in one particular arrangement in accordance with the invention said one electrode is in the form of a metal rod and the other electrode is in the form of a tube surrounding one end of the rod. In such an arrangement, where as is normally the case said other electrode coaxially surrounds said one electrode, then, in accordance with the invention, the arrester is constructed so that $$\pi r_1^2(x+r_2)>(4/3)\pi r_2^3$$

where $r_1$ is the radius of said one electrode $r_2$ is the internal radius of said other electrode; and, x is the axial overlap of the two electrodes.

One excess voltage arrester in accordance with the invention will now be described, by way of example, with reference to the accompanying drawing in which.

Figure 1:
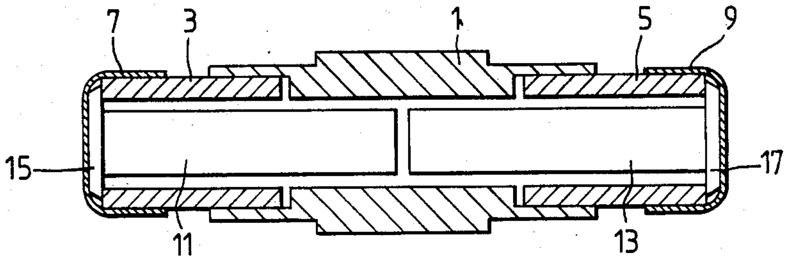
FIG. 1 is a sectional side view of the arrester.

Referring to FIG. 1, the arrester includes a hermetically sealed, hollow, cylindrical, gas-filled enclosure. The enclosure comprises a central tubular metal portion 1 having a portion of increased internal diameter at each end which is sealed coaxially, in overlapping relation, to a tubular ceramic member 3 or 5. A pair of metal end caps 7 and 9 respectively close the ends of the ceramic members 3 and 5.

Housed coaxially within the enclosure are a pair of axially spaced, one-piece, cylindrical copper electrodes 11 and 13, each electrode having an outwardly extended flange 15 or 17 at its outer end which is sealed between the base of the adjacent end cap 7 or 9 and the end of the adjacent ceramic member 3 or 5.

The gap between the inner ends of the electrodes 11 and 13 lies centrally with the central member 1 of the enclosure the central part of whose inner surface serves as a third electrode of the arrester. In use of the arrester the end caps 7 and 9 are typically respectively connected to a pair of lines connected with an equipment which it is desired to protect against excess voltage, and the metal tubular member 1 is grounded. On the occurrence of a voltage between the two electrodes 11 and 13, or between either electrode 11 or 13 and ground, in excess of the arrester d.c. strike voltage, a discharge occurs in the enclosure, thereby protecting the equipment from excess voltage. The desired d.c. strike voltage is obtained by appropriate choice of the pressure and composition of the gas filling, and the geometry of the electrode structure.

Figure 2:
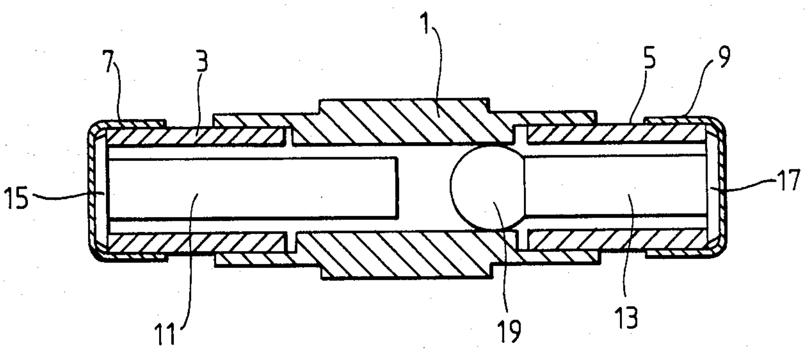
FIG. 2 is the same view of the arrester when overheated.

If the discharge is maintained for a prolonged period, e.g. 4 to 5 seconds, the heat generated by the discharge causes one end of one or both of the electrodes 11 and 13 adjacent the discharge to melt. Under the action of surface tension the molten material takes up a spherical shape 19 and contacts the member 1, as shown in FIG. 2 in respect of electrode 13. The electrode is thus permanently shorted to ground terminating the discharge and preventing further generation of heat in the arrester which might lead to dangerous overheating and fire.

It will be appreciated that for reliable operation the radius of the sphere of molten material 19 must reach a value greater than the internal radius of the central portion of the member 1 before the electrode has melted back into the associated ceramic member 3 or 5. To a first approximation this requires that $$\pi r_1^2(x+r_2)>(4/3)\pi r_2^3$$

where $r_1$ is the radius of the electrode $r_2$ is the internal radius of the central part of the member 1; and x is the axial overlap of the electrode and the member 1.

It will be understood that in order for the molten material to form into a sphere rather than fall under the action of gravity, the electrode dimensions will be relatively small, and by virtue of the above required relation between $r_1$, $r_2$ and x, the difference between $r_1$ and $r_2$ will be quite small if x is not to be impracticably large. Typically $r_2-r_1$ is 0.5 millimeters or less.

A further advantage of the invention is that reliable fail short operation on overheating is obtained whether the arrester is mounted horizontally or vertically, and when mounted vertically, whether the discharge is restricted to the top or bottom half of the arrester.

It will be understood that the invention is applicable to arresters having a different electrode geometry to that of the arrester described by way of example, and in particular is applicable to arresters having only two electrodes or more than three electrodes.

I claim:

1. An excess voltage arrester comprising a gas filled enclosure and an electrode structure housed within the enclosure which structure defines at least one discharge gap, said structure including (A) a first electrode, having an end portion in the form of a metal rod; and (B) a second electrode having a portion in the form of a tube, said portion of said second electrode coaxially surrounding said end portion of said first electrode, the arrester being constructed so that $\pi r_1^2(x+r_2)>4/3\pi r_2^3$, where $r_1$ is the radius of said end portion of said first electrode, $r_2$ is the internal radius of said portion of said second electrode and x is tha axial overlap of the two portions;

(C) and the material of which said end portion of the first electrode consists being such that (i) on overheating of the arrester due to the occurrence of a discharge in the arrester over a prolonged period, (ii) an end part of said end portion of the first electrode melts, (iii) the remainder of said first electrode remaining unmelted, (iv) said end part taking up under the action of surface tension a generally spherical form supported on said remainder, (v) the radius of said end part when molten being such that said end part will contact said portion of the second electrode regardless of the orientation of the arrester.

2. An excess voltage arrester according to claim 1 wherein said portion of said first electrode consists of copper.

* * * * *